Dec. 18, 1962 L. J. HOFFMAN 3,068,833
INSTRUMENT ILLUMINATION SYSTEM
Filed June 22, 1960 2 Sheets-Sheet 1
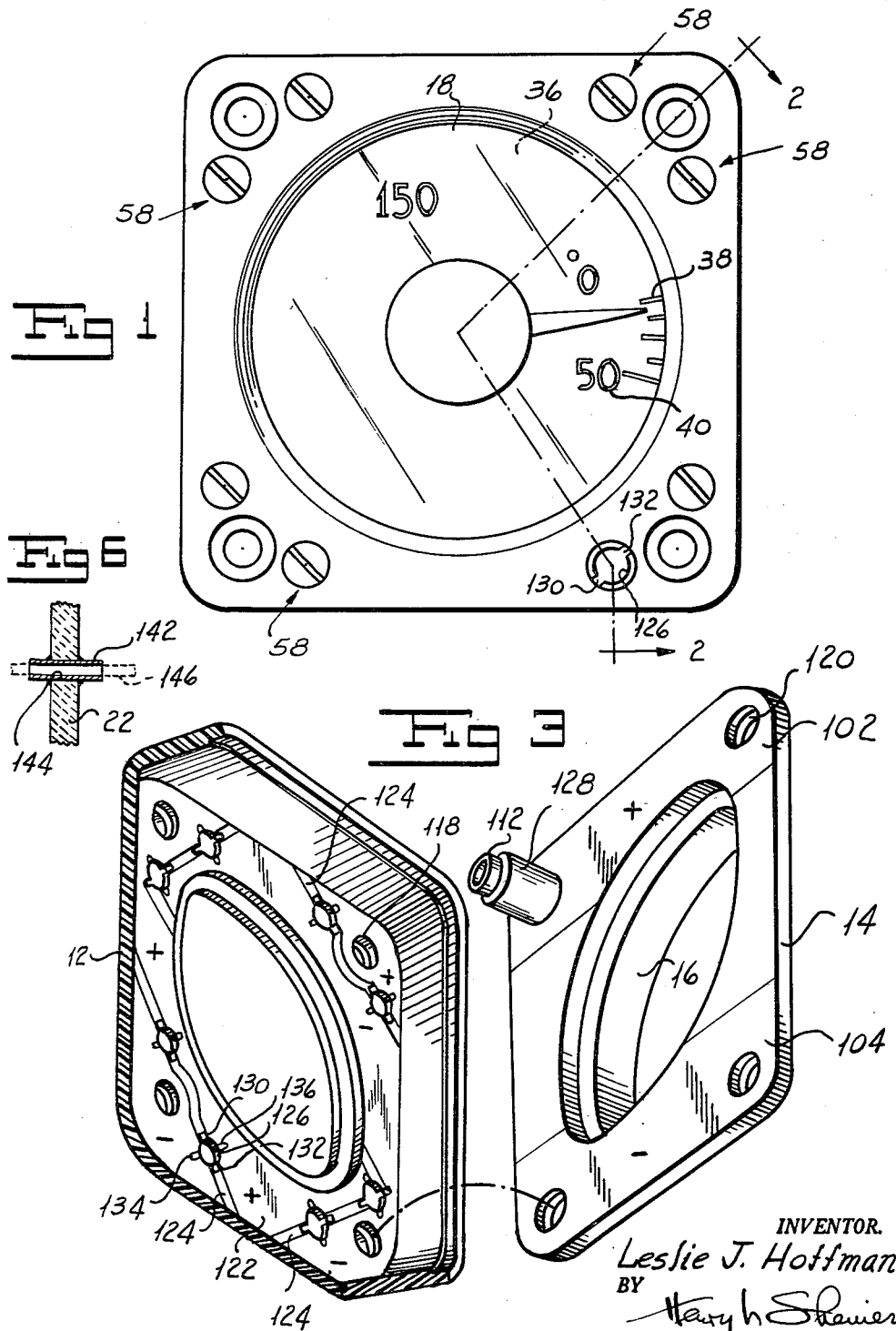
INVENTOR.
Leslie J. Hoffman
BY
Harry L. Shenier
ATTORNEY

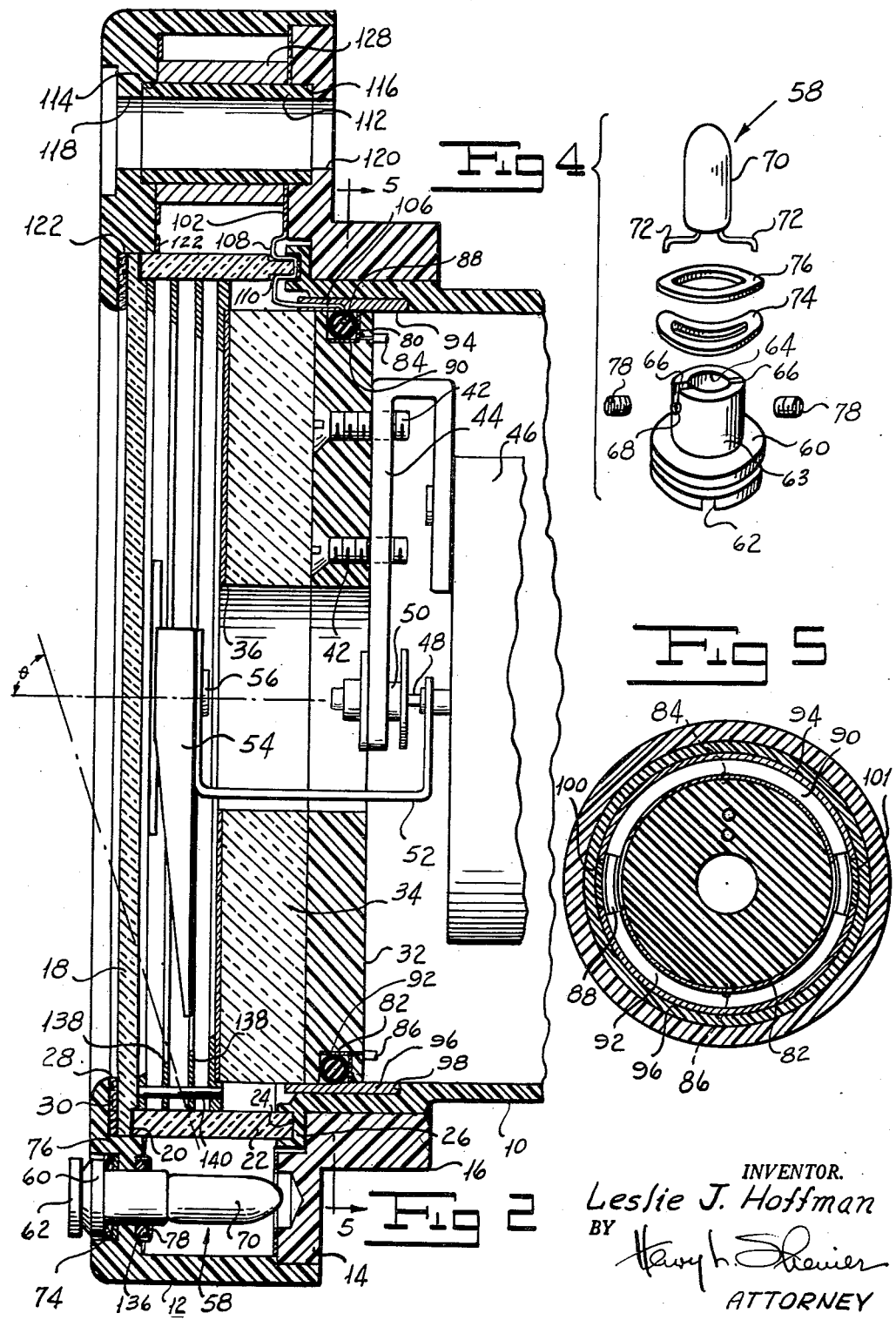

United States Patent Office 3,068,833
Patented Dec. 18, 1962

3,068,833
INSTRUMENT ILLUMINATION SYSTEM
Leslie J. Hoffman, Orange, Conn., assignor to United Aircraft Corporation, East Hartford, Conn., a corporation of Delaware
Filed June 22, 1960, Ser. No. 37,906
4 Claims. (Cl. 116—129)

My invention relates to an instrument illumination system and more particularly to an improved illumination system for aircraft instruments and the like.

Proper illumination of aircraft instruments and instrument panels presents an extremely difficult problem. It is necessary that both the dial face of the instrument and the instrument pointer be illuminated with sufficient brilliance to permit the observer readily to read the indication provided by the instrument. At the same time there must be no interference with the pilot's night vision.

It has been the practice in the prior art to illuminate aircraft instruments by a certain red light identified as "aviation red." Various methods of illuminating the instrument with such light have been adopted. For example, internal illuminating devices have been employed. Alternatively, external light sources have been used to flood the instrument face with light transmitted through the cover glass of the instrument. While aviation red light does not seriously affect the pilot's night vision, the systems making use of this light have the same inherent problems of glare, stray light, and poor light distribution as do systems employing any other color light.

There have been suggested in the prior art many different systems for illuminating aircraft instruments in such manner as to minimize the problems of glare, stray light, and proper light distribution mentioned hereinabove. None of these systems have been entirely satisfactory. When the arrangement is such as to minimize glare and stray light, the illumination of the pointer has proved to be unsatisfactory. Where the design is such that proper pointer illumination is achieved, glare and stray light become excessive.

One solution which has been suggested in the prior art for illuminating an aircraft instrument dial is to illuminate a clear plastic block disposed behind an opaque dial by light directed toward the edge of the block. Reflected light within the block passes out through dial markings engraved in the opaque face. While this arrangement provides a uniformly lit and relatively glare-free dial, it does not solve the problem of properly illuminating the pointer.

In general two arrangements for illuminating the pointer of an instrument having an edge-lit dial have been suggested in the prior art. In the first of these systems light is piped from the dial block into the pointer stem then up the shaft to the pointer hand and along the hand to its end. This method of lighting the pointer embodies a number of defects. First, it requires that light be carried over a relatively long transmission path from the block to the end of the pointer with the result that much light is lost. Further, with such a system the pointer illumination is dimmest at the tip of the pointer which is the very point where the brightest illumination is desired since this is the point at which the instrument dial must be read.

As an alternative to the method of illuminating a pointer outlined above, it has been suggested that the pointer be flooded with light. In order to accomplish this result, narrow slots are formed in the spacer ring around the periphery of the dial between the dial face and the dial floods through these slots and strikes the pointer cover glass. Light from the source which edge-lights the to illuminate the latter. This arrangement affords satisfactory illumination when the slots are sufficiently wide so that they bleed a relatively large quantity of light. However, when the slots are thus made sufficiently large for good pointer illumination, glare and stray light from the slots are excessive with the result that this system becomes entirely impracticable. The best lighting designs which have heretofore been provided in the prior art employ this slot technique arranged to effect a compromise between the desired pointer brilliance and the undesirable glare and stray light. That is, the pointers in such a system are made only so bright as is consistent with the maximum tolerable glare, and the overall system is not as satisfactory as is desirable.

I have invented an instrument illumination system which overcomes the defects of systems of the prior art pointed out hereinabove. My instrument illumination system is especially adapted for use in illuminating aircraft instruments and aircraft instrument aircraft panels. My system provides a uniformly lit dial together with such pointer illumination as permits the instrument to be read with ease while at the same time minimizing glare and stray light. My instrument illumination system is simple and compact in construction for the result achieved by the system.

One object of my invention is to provide an instrument illumination system which overcomes the defects of systems of the prior art.

Another object of my invention is to provide an instrument illumination system which is especially adapted for use in illuminating the instrument panel of an aircraft.

A further object of my invention is to provide an instrument illumination system which effectively illuminates an instrument dial and pointer while at the same time minimizing glare and stray light.

Yet another object of my invention is to provide an instrument illumination system which is simple and compact in construction.

Other and further objects of my invention will appear from the following description.

In general my invention contemplates the provision of an instrument illumination system in which light from an external source passes through an aviation red skirt ring to illuminate the instrument dial through an edge-lit, dial-illuminating block disposed behind the etched opaque dial and to flood light onto the instrument pointer. I provide my assembly with a plurality of spaced louver rings of predetermined width disposed between the face glass of the instrument and the instrument dial to minimize the effect of glare and stray light. This arrangement effectively lights the pointer with the greatest brilliance at the tip and affords the observer a clear view of the dial and pointer while blocking direct paths from the observer's normal line of vision to the skirt ring through which light floods onto the pointer.

In the accompanying drawings which form part of the instant specification and which are to be read in conjunction therewith and in which like reference numerals are used to indicate like parts in the various views:

FIGURE 1 is a front elevation of an instrument employing my instrument illumination system.

FIGURE 2 is a sectional view of the instrument shown in FIGURE 1 taken along the line 2—2 of FIGURE 1 and drawn on an enlarged scale.

FIGURE 3 is an exploded perspective view of the instrument light housing and back flange illustrating the manner in which electrical power is coupled to the instrument lamps.

FIGURE 4 is an exploded perspective view of one form of lamp assembly which may be used in my instrument illumination system.

FIGURE 5 is a sectional view of the instrument show in FIGURE 1, taken along the line 5—5 of FIGURE 2 and drawn on a reduced scale.

FIGURE 6 is a fragmentary sectional view illustrating an alternative arrangement for making electrical connections in my instrument illumination system.

Referring now to FIGURES 1 to 3 of the drawings, my instrument illumination system includes a cylindrical case 10 formed of any suitable material such, for example, as plastic or the like. The case 10 carries a light housing 12 which may, for example, be rectangular in shape. Housing 12 is secured by any suitable means such as by a suitable cement or the like to a back flange 14 provided with a collar 16 carried by the case 10 and secured to the case by any suitable means such as an adhesive or the like. The housing 12 and its back flange 14 may conveniently be formed of the same material as that of which the case 10 is formed.

I provide my assembly with a face glass 18 having a peripheral groove 20 which receives a skirt ring 22 formed of a material such as aviation red glass. I solder the edge of the ring 22 in the peripheral groove 20 to secure the ring to the face glass. The solder in the groove 20 not only secures the parts to each other but also as will be explained hereinafter reduces the "halo effect" which otherwise would exist owing to the passage of light from the skirt ring 22 to the face glass 18. An annular recess 24 formed in a peripheral flange 26 on the end of the case 10 receives the other edge of the skirt ring 22. I dispose a gasket 28 formed of any suitable material between the face glass 18 and a bezel 30 formed on the housing 12. Within the case 10 I provide a dial mounting plate 32 which carries a light transmission block 34 formed of any suitable material which is adapted to transmit light to an opaque dial 36 carried by the block. As can be seen by reference to FIGURE 1, I etch the dial 36 or otherwise provide the dial with marks or graduations 38 and with numerals 40 indicating the significance of the marks. From the structure just described it will be apparent that light from the block 34 passes outwardly through the marks 38 and the numerals 40 to permit the dial 36 to be read.

I employ any appropriate means such, for example, as screws 42 for securing an instrument bracket 44 to the dial mounting plate 32. Bracket 44 supports the instrument mechanism 46 which may be any suitable instrument which, for example, produces its output indication in the form of an angular displacement of a shaft 48. I rotatably support shaft 48 in a bearing 50 carried by bracket 44. A generally U-shaped arm 52 secured to the shaft 48 for movement therewith provides a driving connection between the instrument shaft 48 and a pointer 54 secured to the arm 52 for movement therewith by any suitable means such, for example, as by a screw 56. It will be apparent that when, in response to operation of the instrument mechanism 46, shaft 48 is moved through a given angular displacement, the pointer 54 moves through the same angular displacement to afford an indication with reference to the marks 38 on the dial 36.

It is to be understood that any suitable source of illumination may be used to transmit light through the skirt ring 22 to the edge of block 34. For example, if my system is to be used in an arrangement in which an entire panel of instruments is illuminated from a common source, then this source may pass light directly through the skirt ring 22. In the particular arrangement I have illustrated, I provide a plurality of lamp assemblies indicated generally by the reference character 58 to illuminate the instrument. Referring to FIGURE 4, I have shown the details of one of the lamp assemblies 58. The assembly 58 includes a base 60 formed of any suitable material such, for example, as a phenolic resin. I provide the base 60 with a slot 62 which facilitates assembly of the lamp in the housing 12 in a manner to be described hereinafter. Base 60 is formed with an upstanding boss 63 provided with a cavity 64 and slots 66 leading downwardly as viewed in FIGURE 4 from the upper edge of the boss 63 to threaded holes 68 at the base of the slots. The assembly 58 includes a bulb 70 provided with a pair of leads 72 adapted to be moved down into the slots 66. In assembling the bulb 70 in the boss 63, before assembly the cavity 64 is filled with a suitable material such, for example, as an epoxy resin. When this has been done, a curved washer 74 of a suitable resilient material and a light-barrier washer 76 are assembled over the boss 62. Respective threaded studs 78 are screwed into the holes 68 and the bulb 70 is assembled in the boss with the leads 72 passing downwardly along the slots 66 and with the ends of the leads disposed in slots in the outboard ends of the studs 78. When the ends of the leads have thus been placed into slots in the ends of the studs or pins 78, they are soldered therein. The lamp assembly 58 is then ready to be secured to the housing 12 in a manner to be described.

Referring now to FIGURES 2, 3, and 5, I form the dial mounting plate 32 with an annular peripheral groove 80, the base and one side of which I coat with a conductive film 82 which as can be seen by reference to FIGURE 5 is discontinuous in two substantially diametrically opposite areas thus to form two sections of the film 82. I connect respective electrical conductors 84 and 86 to the two sections of the film 82 through the plate 32. I dispose an O ring 88 formed of any suitable resilient insulating material in the annular groove 80. Ring 88 carries respective conductive coatings 90 and 92 each of which occupies a segment of the ring and which coatings 90 and 92 contact the respective sections of the film 82. I mount respective conductive strips 94 and 96 in an annular groove 98 in the inner surface of the casing 10. Respective segments 100 and 101 of insulating material separate the strips 94 and 96. From the structure just described it will be apparent that the conductive segments 90 and 92 provide electrical connections between the sections of the film 82 to which the respective conductors 84 and 86 are connected and the strips 94 and 96.

As can best be seen by reference to FIGURE 3, the back flange 14 of the lamp housing carries respective coatings 102 and 104. Referring again to FIGURE 2, I solder one end 106 of a spring loaded conductive strip 108 to the strip 94. Strip 108 passes around the edge of the skirt ring 22 through a groove 110 to the conductive film 102. To provide a hermetic seal for the area enclosed by the case 10 and the skirt ring 22, I solder the strip 108 in the groove 110 and I provide any suitable hermetic seal between this region of the skirt ring and the groove 24 on the flange 26 of the casing 10. I employ a similar electrical connection between the conductive strip 96 and the film 104 of conductive material. Since this structure is similar to that described in connection with the strip 108, I will not describe it in detail.

Referring now to FIGURES 2 and 3 in assembling the back flange 14 on the housing 12, I employ a plurality of spacers or sleeves 112, the ends of which are received by respective recesses 114 and 116 in the housing 12 and in the back flange 14. Conveniently, I employ four such spacers. These spacers may be formed of any suitable insulating material such, for example, as nylon. Conveniently, each sleeve 112 registers with respective openings 118 and 120 in the front of housing 12 and in the back flange 14 to permit the housing to be mounted.

As can best be seen by reference to FIGURE 3, the inner surface of the front of the housing 12 is provided with a conductive film 122 divided into areas by a plurality of non-conductive spaces 124. I provide housing 12 with a plurality of openings 126, each of which is intersected by a non-conductive space 124. Each of the openings 126 receives, in a manner to be described hereinafter, one of the lamp assemblies 58. For purposes of clarity in explanation, let us assume that the conductors 84 and 86 are respectively positive and negative. With this arrangement the film 102 is connected to the positive through the medium of segment 90 and strip 94 while the area 104 is connected to the negative. I have indicated these connections respectively by plus and minus signs respectively on the film 102 and on the film 104 in FIGURE 3. Each of the spacers 112 carries a sleeve 128 of a suitable conductive material such, for example, as brass. When the housing 12 is assembled with the back plate 14, the conductive sleeves 128 make connections between the films 102 and 104 and certain areas of the conductive film 122 on the inner surface of the front of housing 12. I have indicated in FIGURE 3 the areas of the film 122 connected to the section of film 102 by plus signs and I have indicated the areas of the film 122 connected to the film section 104 by minus signs.

In mounting a lamp assembly 58 in the housing 12, the assembly 58 is inserted into one of the openings 126. Respective notches 130 and 132 in each of the holes 126 and in alignment with the intersecting non-conductive space 124 permit the studs of pins 78 to pass through the opening. When the lamp assembly has thus been inserted in a hole, it is rotated through 90° so that the pins 78 fall into respective detent slots 134 and 136, in which slots they are held by the spring washer 74. It will be appreciated that when this has been done, the respective leads 72 are connected between the positive and negative terminals of the source of potential. When an assembly 58 is in position, the washer 76 covers the slots 130 and 132 of the socket 126 to prevent leakage of light out through these slots. Not only does the washer 76 thus prevent light leakage but also it provides a surface on which the resilient washer 76 can slide during the removal and insertion of the assembly 58.

From the structure thus described it will be apparent that the lamps 70 direct light through the skirt ring 22 to cause the light to pass through the block 34 and outwardly through the marks 38 and 40 in the opaque dial face 36. It will be apparent also that light from the lamps passes through the skirt ring 22 toward the pointer 54. Within the space between the face glass 18 and the dial face 36, I mount a plurality of light-baffles or louvers 138. I secure the louvers 138 in spaced relationship on pins 140 to maintain a predetermined space between the louvers. It will readily be appreciated that the spacing of the louvers and the width of the louvers determine the observer's critical angle θ for glare. Each of the louvers or baffles 138 has a fixed outside diameter which is such as to permit it to fit into the skirt glass 22. The inside diameter of the louver 138 closest to the inside face of the cover glass matches the diameter of the opening of bezel 30. Each successive louver in a direction from the face glass 18 toward the dial face 36 has a smaller inside diameter so that the louver diameters conform to an imaginary conical slope toward the dial face. The slope of this conical shape is determined by the size of the opening in the bezel 30, by the arc of the dial and by the distance from the cover glass to the dial. The louver closest to the dial face is located flush with the edge of the dial block 34 to prevent stray light from escaping around the circumference of the dial block. The louvers may be any suitable opaque material such, for example, as brass. Conveniently, I form the assembly of the louvers as an integral unit which can be placed within the assembly of the face glass and skirt ring 22 before this is assembled in the instrument. In one form of my louver assembly I solder the louvers 138 to four pins 140 equally spaced around the assembly. To ensure that the maximum amount of light is permitted to pass inwardly radially through the skirt ring 22 toward the pointer 54, the louvers are made as thin as is practicable. I so space the louvers in proportion to the width of the louver rings 138 as to maintain the critical glare angle θ to approximately 60° or greater.

Referring now to FIGURE 6, I have shown an alternate means for making the required electrical connection through the skirt ring 22. In this form of the invention I solder a small tubular guide 142 within an opening 144 in the ring 22. I then pass a small lead indicated in broken lines in FIGURE 6 by the reference character 146 through the tube 140. When this has been done, I hermetically seal the opening by soldering wire 146 within the tube.

In use of my instrument illumination system light from the assemblies 58 passes through the skirt ring 22 to the illuminating block 34 and from the block out through the etched openings 38 and 40 in the opaque dial 36 thus to illuminate the dial. It is to be noted that owing to the two-piece construction of the cover glass and skirt ring that the skirt ring can be made of material such as will cause aviation red light to pass from the source such as the lamp assembly 58 outside the hermetically sealed space to the inside of the skirt ring and cover glass assembly. The connection between the lamp and the source of power is provided by the conductive O-ring 88 in engagement with the film 82 in engagement with the conductive strips 94 and 96. In assembling the instrument, I dispose the assembly of louvers or baffles 138 in the space. The arrangement of the louvers is such that the observer's critical glare angle θ is approximately 60° or greater. I accomplish this result by spacing the louvers or baffles 138 on the pins 140 properly in proportion to the width of the individual baffles. At the same time I form the baffles or louvers 148 from as thin a material as is possible to permit the maximum amount of light from skirt ring 22 to flood the pointer 54.

It will be seen that I have accomplished the objects of my invention. I have provided an intrument illumination system which overcomes the defects of systems of the prior art. My system effectively illuminates both the instrument dial and the pointer without excessive stray light or glare. My assembly is extremely simple and compact in construction for the desirable result achieved.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An instrument illumination system including in combination a support provided with a viewing opening at the front thereof, a dial, a pointer, means mounting said dial and said pointer in cooperative relationship behind said viewing opening in a position to permit them to be seen by an observer from a normal viewing position, means comprising a source of illumination for directing light from the side said opening to flood said pointer with light through a bleed-in area in front of said face, a plurality of light louvers each of which is provided with an opening and means mounting said louvers in spaced relationship between said viewing opening and said dial with one of said louvers spaced from both said opening and said dial to divide said bleed-in area into sections to provide a substantial source of indicator illumination while not unduly restricting the viewing opening.

2. An instrument illumination system including in combination a support provided with a viewing opening at the front thereof, a face, an indicator, means mounting said face and said indicator in cooperative relationship on said support behind said viewing opening in a position to permit them to be seen by an observer from a normal viewing position, means comprising a source of illumination for directing light from the side of said opening to flood said pointer with light through a bleed-in area in front of said face, a plurality of light louvers each of which is provided with an opening and means mounting said louvers in spaced relationship between said viewing opening and said face with one of said louvers spaced from both said opening and said dial to divide said bleed-in area into sections to provide a substantial source of indicator illumination while not unduly restricting the viewing opening, said louver openings being progressively smaller in the direction from said opening to said face.

3. An instrument illumination system including in combination a support having a viewing opening, a block formed of optically conductive material, a face carried by said block, means mounting said block on said support behind said opening, a pointer, means mounting said pointer behind said opening in cooperative relationship with said face to permit the pointer to be viewed by an observer looking from a normal viewing position toward said opening, a skirt ring formed of translucent material surrounding said block and said pointer, means comprising a source of illumination for lighting said skirt ring to transmit light to said block and to flood said pointer with light and means comprising a plurality of spaced optical louvers for shielding said viewing position from light emanating directly from said ring, one of said louvers being spaced both from said opening and from said face to provide a substantial source of pointer illumination while not unduly restricting the viewing opening.

4. An instrument illumination system including in combination a housing, means forming a bezel providing a viewing opening for said housing, a face glass, means mounting said face glass in said bezel behind said opening, a dial, means mounting said dial within said housing behind said face glass, a pointer, means mounting said pointer in cooperative relationship within said housing to permit it to be viewed by an observer looking from a normal viewing position toward said opening, a skirt ring formed of translucent material, means mounting said skirt ring within said housing in a position at which it surrounds said dial, means comprising a source of illumination for lighting said skirt ring to flood said pointer with light, means comprising a plurality of optical louvers for shielding said viewing position from light emanating directly from said skirt ring and means mounting said louvers in spaced relationship within said housing between said face glass and said dial, one of said louvers being spaced both from said face glass and said dial to provide a substantial source of pointer illumination while not unduly restricting the viewing opening said means for mounting said skirt ring within the housing comprising means providing an optical barrier for preventing the transmission of light from said skirt ring to said face glass outside said louvers.

References Cited in the file of this patent
UNITED STATES PATENTS

| | | |
|---|---|---|
| 2,259,910 | Rylsky | Oct. 21, 1941 |
| 2,702,340 | Thieboat | Feb. 15, 1955 |
| 2,768,606 | Polye et al. | Oct. 30, 1956 |
| 2,837,052 | Viret | June 3, 1958 |
| 2,847,970 | Smith | Aug. 19, 1958 |